US012737290B2

(12) United States Patent
Ma

(10) Patent No.: US 12,737,290 B2
(45) Date of Patent: Sep. 15, 2026

(54) SYSTEM, APPARATUS, NON-TRANSITORY COMPUTER READABLE MEDIUM, AND METHOD OF STORING AN EMBEDDING TABLE

(71) Applicant: Samsung Electronics Co., Ltd., Suwon-si (KR)

(72) Inventor: Kaige Ma, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/027,507

(22) Filed: Jan. 17, 2025

(65) Prior Publication Data

US 2026/0195266 A1 Jul. 9, 2026

(30) Foreign Application Priority Data

Jan. 8, 2025 (CN) ........................ 202510031168.7

(51) Int. Cl.
*G06F 12/02* (2006.01)
*G06F 12/0884* (2016.01)

(52) U.S. Cl.
CPC ...... *G06F 12/0292* (2013.01); *G06F 12/0884* (2013.01); *G06F 2212/27* (2013.01); *G06F 2212/306* (2013.01); *G06F 2212/454* (2013.01); *G06F 2212/60* (2013.01)

(58) Field of Classification Search
CPC ......................... G06F 12/0292; G06F 12/0884
See application file for complete search history.

(56) References Cited

U.S. PATENT DOCUMENTS

| | | | | |
|---|---|---|---|---|
| 9,830,451 | B2 | 11/2017 | Singla et al. | |
| 11,036,741 | B2 | 6/2021 | Zhou et al. | |
| 11,816,025 | B2 | 11/2023 | Hazel et al. | |
| 2023/0102226 | A1* | 3/2023 | Kim | G06N 3/063 711/154 |
| 2023/0185487 | A1 | 6/2023 | Pathiyakkara Thombra et al. | |
| 2023/0259584 | A1 | 8/2023 | Hillel et al. | |

FOREIGN PATENT DOCUMENTS

| | | | |
|---|---|---|---|
| CN | 106874396 | A | 6/2017 |
| CN | 110442038 | A | 11/2019 |

* cited by examiner

*Primary Examiner* — Jae U Yu
(74) *Attorney, Agent, or Firm* — Fish & Richardson P.C.

(57) ABSTRACT

One or more example embodiments are directed to a storing method of an embedding table, an apparatus, an electronic device, a non-transitory storage medium, and/or a system, the storing method including: acquiring an embedding table; and storing the embedding table in a memory of at least one CXL-PNM device, the storing enabling the at least one CXL-PNM device to perform parallel lookup of the embedding table in the memory using processing circuitry of the at least one CXL-PNM device, wherein the at least one CXL-PNM device includes the memory and the processing circuitry.

14 Claims, 14 Drawing Sheets

FIG. 8

Access List

| AID | Items (key) | Frequent Items (Ordered) |
|---|---|---|
| 001 | I1, I2, I3 | I1, I2, I3 |
| 002 | I2, I3, I4 | I2, I3, I4 |
| 003 | I4, I5 | I4 |
| 004 | I1, I2, I4 | I1, I2, I4 |
| 005 | I1, I2, I3, I5 | I1, I2, I3 |
| 006 | I1, I2, I3, I4 | I1, I2, I3, I4 |

Data Structure of Sub FP-Tree (min_sup=3)

Data Structure of Global FP-Tree

SYSTEM, APPARATUS, NON-TRANSITORY COMPUTER READABLE MEDIUM, AND METHOD OF STORING AN EMBEDDING TABLE

CROSS-REFERENCE TO RELATED APPLICATION

This application is based on and claims priority under 35 U.S.C. § 119 to Chinese Patent Application No. 202510031168.7 filed on Jan. 8, 2025, in the Chinese Intellectual Property Office, the disclosure of which is incorporated by reference herein in its entirety.

BACKGROUND

Some example embodiments of the inventive concepts relate to the field of storage and near memory computation, and more particularly, relate to a storing method, an apparatus of an embedding table, an electronic device, a non-transitory storage medium, a system and/or a computer program product, etc.

Embedding is a technology that disassembles and/or automatically disassembles a concept (e.g., software concept, etc.) into feature vectors. It is used to map discrete features of input data to feature vectors for processing by downstream neural networks. Embedding plays a key role in a recommendation system. It may transform a recommendation algorithm from "exact matching" to "fuzzy lookup", thereby "drawing inferences from one example" and improving the expansion capability of the recommendation algorithm. An embedding table (EMB) usually comprises most of the parameters in a recommendation system model. The size can reach terabytes, and the sizes of the embedding tables are still rising rapidly, so it is difficult to put them in a memory of a single graphics processing unit (GPU) for use.

Ideally, in order to solve larger-scale models, only the number of GPUs need to be increased, but the cost of GPUs relative to CPUs is very high, and multi-GPU training will introduce additional network communication overhead, resulting in degraded training performance. In addition, embedding tables may also be stored in solid state drives, but this solution has worse read latency and/or bandwidth, which will make training large-scale recommendation system models very time-consuming.

SUMMARY

A storing method and/or apparatus of an embedding table, an electronic device, a non-transitory storage medium, a system, and/or a computer program product, etc., provided in some example embodiments of the inventive concepts may at least improve and/or solve one or more of the above technical problems and/or other technical problems not mentioned above.

According to at least one example embodiment of the inventive concepts, there is provided a storing method of an embedding table, the storing method including: acquiring an embedding table; and storing the embedding table in a memory of at least one CXL-PNM device, the storing enabling the at least one CXL-PNM device to perform parallel lookup of the embedding table in the memory using processing circuitry of the at least one CXL-PNM device, wherein the at least one CXL-PNM device includes the memory and the processing circuitry.

Additionally, the storing method may include, generating the embedding table based on a dataset containing at least one transaction, wherein each data item in the dataset is contained in a transaction of the dataset, and storing an embedding vector corresponding to an item set in the embedding table into the memory of the at least one CXL-PNM device, each item of the dataset has an access correlation greater than a desired threshold.

Additionally, the storing method may include obtaining the item set of which the access correlation is greater than the desired threshold based on a frequent pattern growth algorithm, and storing the embedding vector corresponding to the obtained item set into the memory of the at least one CXL-PNM device.

Additionally, the at least one CXL-PNM device may be a plurality of CXL-PNM devices, and the storing method may include evenly distributing a computing task of obtaining the item set of which the access correlation is greater than the desired threshold in the dataset to processing circuitry of each of the plurality of CXL-PNM devices, and completing the computing task through parallel work of the processing circuitry of each of the plurality of CXL-PNM devices.

Additionally, the storing method may include generating a feature embedding table for each dimension of the dataset, each of the feature embedding tables corresponding to a feature of a respective dimension, and performing parallel computing on each of the feature embedding tables using the processing circuitry of the at least one CXL-PNM device, the parallel computing including, generating a sub-frequent pattern tree corresponding to each of the feature embedding tables, setting a corresponding support threshold for each of the sub-frequent pattern trees, merging attributes and links of each of the sub-frequent pattern trees to obtain a global frequent pattern tree, sequentially processing the obtained global frequent pattern tree from a plurality of node items included in the global frequent pattern tree starting from a bottom layer of the obtained global frequent pattern tree, the sequentially processing including, for a current node item of the plurality of node items, generate a conditional frequent pattern library corresponding to the current node item based on a sub-frequent pattern tree corresponding to the current node item in the global frequent pattern tree, generating a conditional frequent pattern tree corresponding to the current node item based on the conditional frequent pattern library corresponding to the current node item and the support threshold of the sub-frequent pattern tree corresponding to the current node item, and obtaining the item set which contains the current node item and of which the access correlation is greater than the desired threshold based on the conditional frequent pattern tree corresponding to the current node item.

According to at least one example embodiment of the inventive concepts, there is provided a storage apparatus of an embedding table, the storage apparatus including: first processing circuitry configured to, acquire an embedding table, and store the embedding table in a memory of at least one CXL-PNM device, the storing enabling the at least one CXL-PNM device to perform parallel lookup of the embedding table in the memory using second processing circuitry of the at least one CXL-PNM device, wherein the at least one CXL-PNM device includes the memory and the second processing circuitry.

Additionally, the first processing circuitry is further configured to: generate the embedding table based on a dataset containing at least one transaction, wherein each data item in the dataset is contained in a transaction of the dataset, and store an embedding vector corresponding to an item set in the embedding table into the memory of the at least one CXL-PNM device, each item of the dataset has an access correlation greater than a desired threshold.

Additionally, the first processing circuitry is further configured to: obtain the item set of which the access correlation is greater than the desired threshold based on a frequent pattern growth algorithm, and store the embedding vector corresponding to the obtained item set into the memory of the at least one CXL-PNM device.

Additionally, the at least one CXL-PNM device is a plurality of CXL-PNM devices, each of the plurality of CXL-PNM devices including second processing circuitries, and the first processing circuitry is further configured to: evenly distribute a computing task of obtaining the item set of which the access correlation is greater than the desired threshold in the dataset to the second processing circuitry of each of the plurality of CXL-PNM devices, and complete the computing task through parallel work of the second processing circuitry of each of the plurality of CXL-PNM devices.

Additionally, the first processing circuitry is further configured to: generate a feature embedding table for each dimension of the dataset, reach of the feature embedding tables corresponding to a feature of a respective dimension, and perform parallel computing on each of the feature embedding tables the second processing circuitry of the at least one CXL-PNM device, the parallel computing including, generating a sub-frequent pattern tree corresponding to each of the feature embedding tables, setting a corresponding support threshold for each of the sub-frequent pattern trees respectively, merging attributes and links of each of the sub-frequent pattern trees to obtain a global frequent pattern tree, sequentially processing the obtained global frequent pattern tree from a plurality of node items included in the global frequent pattern tree starting from a bottom layer of the obtained global frequent pattern tree, the sequentially processing including, for a current node item of the plurality of node items, generate a conditional frequent pattern library corresponding to the current node item based on a sub-frequent pattern tree corresponding to the current node item in the global frequent pattern tree, generate a conditional frequent pattern tree corresponding to the current node item based on the conditional frequent pattern library corresponding to the current node item and the support threshold of the sub-frequent pattern tree corresponding to the current node item, and obtain the item set which contains the current node item and of which the access correlation is greater than the desired threshold based on the conditional frequent pattern tree corresponding to the current node item.

According to at least one example embodiment an electronic device includes: at least one processor; and at least one memory configured to store computer executable instructions, wherein the computer executable instructions, when executed by the at least one processor, cause the at least one processor to execute the storing method of the embedding table as described above.

According to at least one example embodiment of the inventive concepts, there is provided a non-transitory computer readable storage medium storing computer readable instructions, wherein the computer readable instructions, when executed by at least one processor, causes the at least one processor to execute the storing method of the embedding table as described above.

According to at least one example embodiment of the inventive concepts, there is provided a system including at least one computing device and at least one storage device storing computer readable instructions, wherein the computer readable instructions, when executed by the at least one computing device, cause the at least one computing device to execute the storing method of the embedding table as described above.

According to at least one example embodiment of the inventive concepts, there is provided a non-transitory computer readable storage medium storing computer readable instructions, wherein the computer readable instructions, when executed by at least one processor, implements the storing method of the embedding table as described above.

One or more technical solutions provided by one or more of the example embodiments of the inventive concepts at least bring the following beneficial effects:

According to at least one example embodiment of the inventive concepts, a storing method and/or apparatus of an embedding table, an electronic device, a non-transitory storage medium, a system and/or a computer program product may include a compute express link (CXL)-processing near memory (PNM) device (e.g., a CXL Expansion based PNM device, etc.) which may be used to store and/or compute an embedding table, so as to solve problems, such as memory limitation and/or storage constraint caused by an over-sized embedding table through storage expansion based on the CXL-PNM device, etc.; when it is used in a recommendation system, the performance of the recommendation system may be improved. Additionally, through processing near memory of the CXL-PNM device, data transmission between computing modules (e.g., taking a central processing unit (CPU) as an example, etc.) and/or a memory resource usage may be reduced or greatly reduced, storage resources of the CPU may be released, and/or a running and/or computational burden of the CPU may be reduced, so as to improve the execution efficiency of the recommendation system and/or improve and/or optimize the performance of the recommendation system, etc.

In addition, centrally storing embedding vectors corresponding to item sets having high access correlation in the CXL-PNM device may improve the query efficiency of the embedding vectors, etc.

In addition, evenly distributing a computing task among multiple CXL-PNM devices may improve and/or optimize the execution efficiency of the task, etc.

In addition, through a multi-support-Parallel Frequent Pattern (MS-PFP-Growth) algorithm, storage and/or computing architectures of a multi-CXL-PNM device may be relied on to more efficiently mine the item sets having high access correlation in data items, so as to centrally store the embedding vectors corresponding to the item sets having high access correlation in multiple CXL-PNM devices more efficiently, etc.

BRIEF DESCRIPTION OF THE DRAWINGS

The drawings here, which are incorporated into and comprise a part of the description, illustrate some example embodiments consistent with the inventive concepts, explain principles of one or more example embodiments of the inventive concepts together with the description, and do not unduly limit the inventive concepts.

FIG. 8 illustrates a schematic diagram of frequently accessed item sets generated in at least one example embodiment of the inventive concepts;

DETAILED DESCRIPTION

Figure 1:
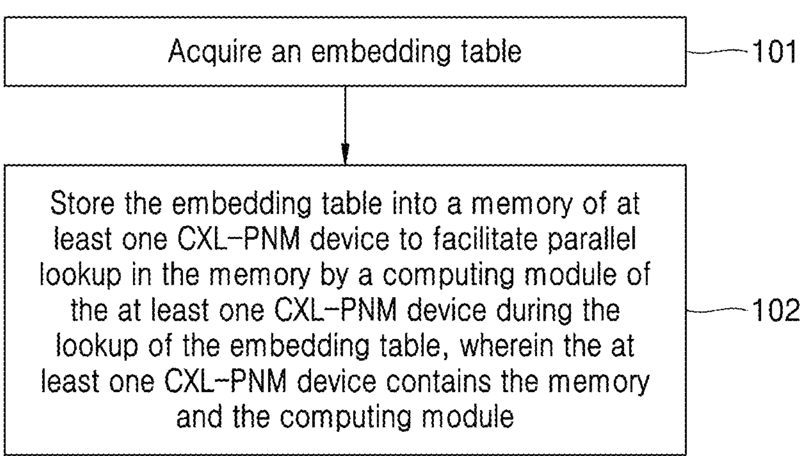
FIG. 1 illustrates a flowchart of a storing method of an embedding table in at least one example embodiment of the inventive concepts.

In order to enable those of ordinary skill in the art to better understand the technical solutions of the example embodiments of the inventive concepts, some example embodiments of the inventive concepts will be clearly and completely described below in conjunction with the drawings.

It should be noted that the terms "first", "second" and the like in the description and claims as well as the above drawings of some example embodiments of the inventive concepts are used to distinguish similar objects, and are not necessarily used to describe a particular order or sequence. It should be understood that data used so may be interchanged under appropriate circumstances so that the example embodiments of the inventive concepts described here can be implemented in sequences other than those illustrated and/or described here. The implementations described in the following example embodiments do not represent all implementations of the example embodiments of the inventive concepts. Rather, they are merely examples of some aspects of the inventive concepts that are specifically described in the appended claims.

It should be noted here that "at least one of several items" occurring herein means including these three parallel situations, "any one of the several items", "a combination of any of the several items", and/or "an entirety of the several items", etc. For example, "including at least one of A and B" means including the following three parallel situations: (1) including A; (2) including B; and (3) including A and B. For another example, "executing at least one of step one and step two" means the following three parallel situations: (1) executing step one; (2) executing step two; and (3) executing step one and step two.

With the exponential growth of massive information on the Internet, users are faced with serious information overload problems. Therefore, a recommendation system comes into being. The recommendation system aims to meet the increasing personalized needs of users through information filtering, and then helps users make choices about information more quickly and/or efficiently. The user behavior data in the recommendation system usually presents a long tail distribution, and most items (e.g., data items, referring to recommendation objects such as items in the user behavior data, etc.) do not exist and/or have very little user behavior data. Therefore, recommendation algorithms cannot only be satisfied with remembering "common high-frequency" patterns, but may be improved by being able to mine and/or automatically mine "low-frequency long-tail" patterns, etc.

Traditional recommendation algorithms may memorize high-frequency patterns, but they cannot be expanded. Therefore, an embedding table may be used to improve the expandability and/or efficiency of recommendation algorithms and mine and/or automatically mine low-frequency, long-tail and/or niche patterns to achieve personalized recommendations, etc.

Due to the large storage space occupied by the embedding tables for recommendation systems, two solutions have been proposed to solve the problem of limited storage of the embedding table.

One suggested solution is a multi-GPU storage system using HugeCTR or the like. HugeCTR is an open-source recommendation system framework, which may split an embedding table into multiple GPU cards of multiple nodes for computing, wherein each GPU card processes partial data. However, this will cause a huge and/or large waste of performance due to the amount of network communication overhead required to facilitate the splitting of the embedding table. The efficiency experiment of the HugeCTR in distributed training when different GPUs are connected through a wireless data link (WDL) shows as much as 90% or so of training time will be spent in acquiring and/or updating embedding parameters, and also shows that data transmission dominates a training cycle. With the continuous emergence of more powerful accelerators and the slow growth of network bandwidth, a gap between data processing speed and data transmission speed will become wider and wider, and the communication bottleneck will become a more serious issue.

Another solution is to offload the embedding table to another device. For example, the embedding table may be stored in a solid state drive. However, because different data correspond to different embedding vectors, and with the increase of datasets and embedding tables, this method will greatly increase the access error rate of the embedding vectors, and the possibility of saving correct embedding vectors in a high bandwidth memory (HBM)/a dynamic random access memory (DRAM) will also become smaller. In addition, the capacity of a solid state drive may reach 10 TB or even hundreds of TB, but reading data from the solid state drive to a CPU memory requires several Gb/s of bandwidth, therefore the bandwidth requirement is high and the data access speed is slow. Therefore, it is not appropriate to store the entire embedding table on the solid state drive because the read overhead will be very large.

RecShard is a fine-grained embedding table partitioning and placement technology for deep learning recommendation models (DLRMs). This technology is based on characteristic differences of an EMB and has the hierarchy of a memory architecture, and achieves performance and efficiency improvements by improving memory usage and reducing access latency.

The RecShard may use a multi-GPU system to store embedding tables. The algorithm operations are as follows: (1) randomly sampling 1% of the entire dataset; (2) looking up the embedding vectors of the sampling result; and (3) distributing the embedding vectors to different GPU HBMs. This algorithm may reduce a GPU error rate by prefetching partial embedding vectors into the HMB, but there are three problems: (1) occupying too many CPU resources; (2) occupying too much GPU HBM; and (3) providing no solution to update the embedding vector during the training process, so the error rate of the embedding vector is still very high.

The RecSSD is a solid state drive memory system based on approximate data processing, and customized for neural recommendation inference. The RecSSD stores frequently accessed embedding tables in the DRAM of a host and less frequently accessed embedding tables in the RecSSD. The RecSSD may use an internal bandwidth to perform embedding table "lookup", implement vector operations and return results in logical blocks. However, the RecSSD occupies too much host memory space (e.g., increased usage of host memory space, etc.), and performing vector operations in a flash translation layer (FTL) may cause increased and/or unnecessary GPU waits, delays, and/or stalls, etc. In addition, only vector addition and vector connection can be implemented in the FTL, therefore, the application scenarios of the RecSSD are very limited, and the implementation of complex vector operations will lead to longer GPU wait times.

In summary, the two solutions to the storage limitation problem of embedding tables in the related art have at least the following problems: (1) a higher total cost of ownership (TCO) of a multi-GPU solution; (2) an increased and/or higher performance waste caused by increased and/or excessive network communication overhead; and/or (3) a large additional read overhead caused by a high access error rate.

In order to solve one or more of the above problems, one or more example embodiments of the inventive concepts provide a storing method and/or apparatus for storing an embedding table, an electronic device, a non-transitory storage medium storing a computer program product, and/or a system, etc. The storing method of the embedding table may be executed by a host (e.g., host device, etc.) or the like, a CXL-PNM device may be used to store and/or compute the embedding table, so as to solve problems such as memory limitations and/or storage constraint caused by an over-sized embedding table through storage expansion based on the CXL-PNM device, and when it is used in a recommendation system, the performance of the recommendation system may be improved; also, through processing near memory of the CXL-PNM device, data transmission between a CPU and a memory may be reduced or greatly reduced, storage resources of the CPU may be released, and/or a running burden of the CPU may be reduced, thereby improving the execution efficiency of the recommendation system and/or increasing and/or optimizing the performance of the recommendation system.

Hereinafter, some example embodiments of the inventive concepts will be specifically described with reference to FIG. 1 to FIG. 14.

FIG. 1 illustrates a flowchart of a storing method of an embedding table in at least one example embodiment of the inventive concepts.

Referring to FIG. 1, in operation 101, an embedding table may be acquired.

According to at least one example embodiment of the inventive concepts, embedding tables used in recommendation systems, image classification, natural language processing, and other fields may be generated and/or acquired. For example, embedding tables may be generated and/or learned during an artificial intelligence, machine, learning, and/or neural network training process, therefore, different tasks and datasets may be desired and/or needed to generate and/or acquire different embedding tables. In at least one example embodiment, pre-trained embedding tables may be acquired to accelerate the training process and/or improve performance, but the example embodiments are not limited thereto.

In operation 102, the embedding table may be stored in a memory of at least one CXL-PNM device to facilitate parallel lookup in the memory by a computing module (e.g., processing circuitry, computing circuitry, computing device, etc.) of the at least one CXL-PNM device during the lookup of the embedding table, wherein the at least one CXL-PNM device includes or contains the memory and the computing module, but is not limited thereto. According to some example embodiments, the computing module may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

According to at least one example embodiment of the inventive concepts, the recommendation system may include a new CXL-PNM-based computing storage architecture to solve, e.g., the problem of memory limitation caused by over-sized embedding tables, but is not limited thereto. It may be understood that the CXL-PNM-based computing storage architecture in at least one example embodiment of the inventive concepts may not be limited to processes applied to the training, verification, use, and the like, of the model, and hereinafter the training process is taken as an example.

Processing near memory (PNM) is a technology that integrates a memory and a logic chip (e.g., processing circuitry, etc.) into an advanced integrated circuit package, but the example embodiments are not limited thereto. By using a memory for data computing, data movement between a CPU and/or GPU and memory may be reduced. Computing functions are performed closer to the memory, which may reduce a bottleneck in data transmission between the CPU and/or GPU and the memory, etc. An open standard CXL may be used in combination with a PNM to facilitate expansion of the memory capacity. Related tests show that PNM solutions based on a CXL interface may improve or greatly improve the performance of applications that desire and/or require high memory bandwidth, such as a recommendation system and/or an in-memory database, etc.

A compute express Link™ (CXL™) is an open standard for high-speed processor-to-device and processor-to-memory interfaces that may make more efficient use of a memory and an accelerator used with a processor. A CXL technology may interconnect different computing and storage resources to improve system performance and/or efficiency. The CXL™ may be used in combination with other technologies, such as a PNM, to help facilitate memory capacity expansion.

A CXL-PNM device is a device that integrates arithmetic functions into a memory semiconductor. By placing compute functions next to a memory, data movement between a CPU and/or GPU and memory is reduced, thereby reducing a bottleneck and/or improving and/or maximizing CPU and/or GPU, etc., processing capability.

Figure 2A:
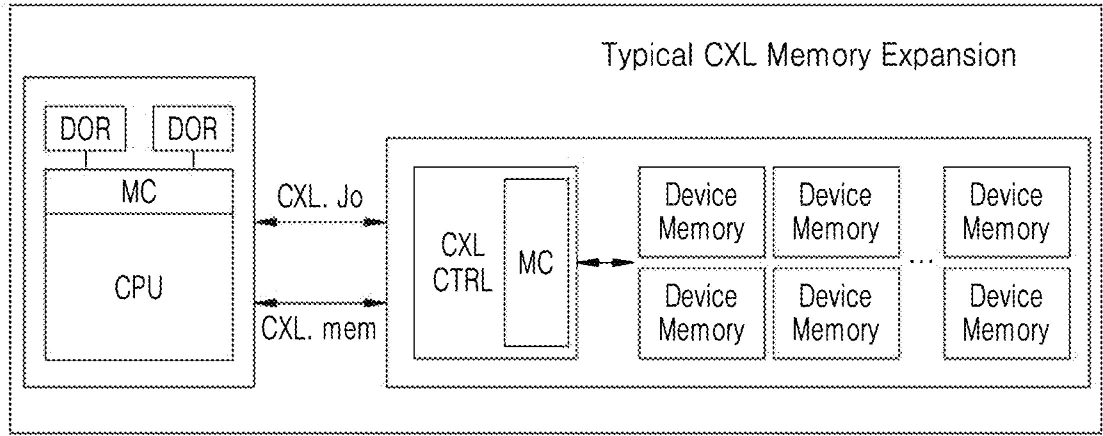
FIG. 2A illustrates a structural schematic diagram of a CXL-based memory expansion in the related art.
Figure 2B:
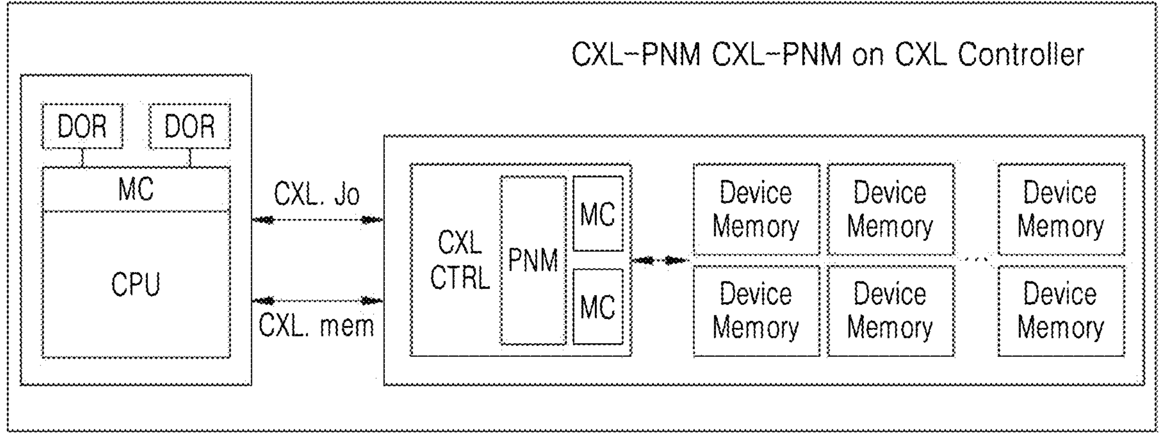
FIG. 2B illustrates a structural schematic diagram of CXL-PNM-based memory expansion according to at least one example embodiment of the inventive concepts.

FIG. 2A illustrates a structural schematic diagram of a CXL-based memory expansion in the related art, and FIG. 2B illustrates a structural schematic diagram of a CXL-PNM-based memory expansion according to at least one example embodiment of the inventive concepts.

Referring to FIG. 2A, a CXL-based memory expansion in the related art is illustrated. A CPU and a CXL device memory are connected through a CXL controller (CXL CTRL) to implement high-speed, low-latency, high-bandwidth data transmission and sharing between computing resources, such as a CPU, etc., and storage resources such as a CXL device memory, etc.

Referring to FIG. 2B, a CXL-based memory expansion according to at least one example embodiment of the inventive concepts is illustrated, which combines the CXL with the PNM technology through the CXL controller to implement CXL-PNM memory expansion based on the CXL controller. The CXL technology may provide a high-speed and/or low-latency data transmission channel(s), so that accelerators in the CPU and PNM may efficiently share and/or access memory resources, etc. In the CXL technology, there are mainly the following key components and concepts:

CXL CTRL: this is the control device and/or circuitry of the CXL and may be responsible for managing and/or controlling CXL connections and/or communications, etc., but is not limited thereto. It may process protocols and/or signals related to the CXL, ensuring that communication between devices is correct and error-free.

Device On-Ramp (DOR): DOR is a device access point, which may allow a device (such as accelerators, memory buffers, etc.) to connect to a CXL network. The DOR may provide a standardized interface for the device to communicate with other components in the CXL network.

Memory Controller (MC): the MC is a component responsible for managing memory access. In a CXL environment, the MC may enable and/or ensure that an access to a shared memory is efficient and/or consistent, but is not limited thereto. In the CXL technology, the MC may work in cooperation with a host CPU, may also work with an accelerator device (such as a PNM, etc.), and/or may be moved onto a memory buffer chip, etc.

CXL. Jo: the CXL. Jo is a federated interface of the CXL, which may allow two or more CXL devices to work in cooperation with each other and, for example, share a memory and/or other resources. Through the CXL. Jo, the devices may be operated as a whole (e.g., a single entity, etc.), thereby improving the overall performance and/or efficiency, etc.

CXL. mem: the CXL.mem is a memory protocol of the CXL protocol, and may define a transmission interface between a CPU and a memory to enable and/or ensure that the CPU may efficiently access and use the shared memory in the CXL network, etc.

Device Memory: the Device Memory refers to memory on an accelerator and/or other devices (e.g., a host, etc.). In a CXL architecture, these memories may be shared and/or accessed by a CPU and/or other devices (such as a PNM, etc.), thereby improving the overall performance and/or resource utilization, etc.

The PNM solution based on the CXL interface may improve or greatly improve the performance in applications desiring and/or requiring high memory bandwidth.

It may be understood that the PNM solution based on the CXL interface may also be implemented by spreading the PNM into the memory, etc.

According to at least one example embodiment of the inventive concepts, computing and storage of the embedding table may be placed in the CXL-PNM device, but is not limited thereto. For example, an operation of an embedding vector (referred to as a vector operation for short) includes, but is not limited to, vector connection, vector summation, vector multiplication, and/or vector averaging, etc., all of which may be placed on the PNM and may be processed using a processing-in-memory (PIM) logic device, but the example embodiments are not limited thereto. For example, the embedding table may be offloaded onto multiple CXL-PNM devices, etc. When the memory capacity of the CXL-PNM is, e.g., 512 GB, the number of CXL-PNM devices may be set from 1 to N according to the desires and/or requirements of the storage space of the embedding table, and N is an integer greater than 1, but the example embodiments are not limited thereto. Assuming that an EMB capacity is M (GB), the number of the required CXL-PNM devices is N=ceil (M/512) (GB). It may be understood that ceil (e.g., ceiling function) means rounding up to the next whole integer.

Figures 3A, 3B:
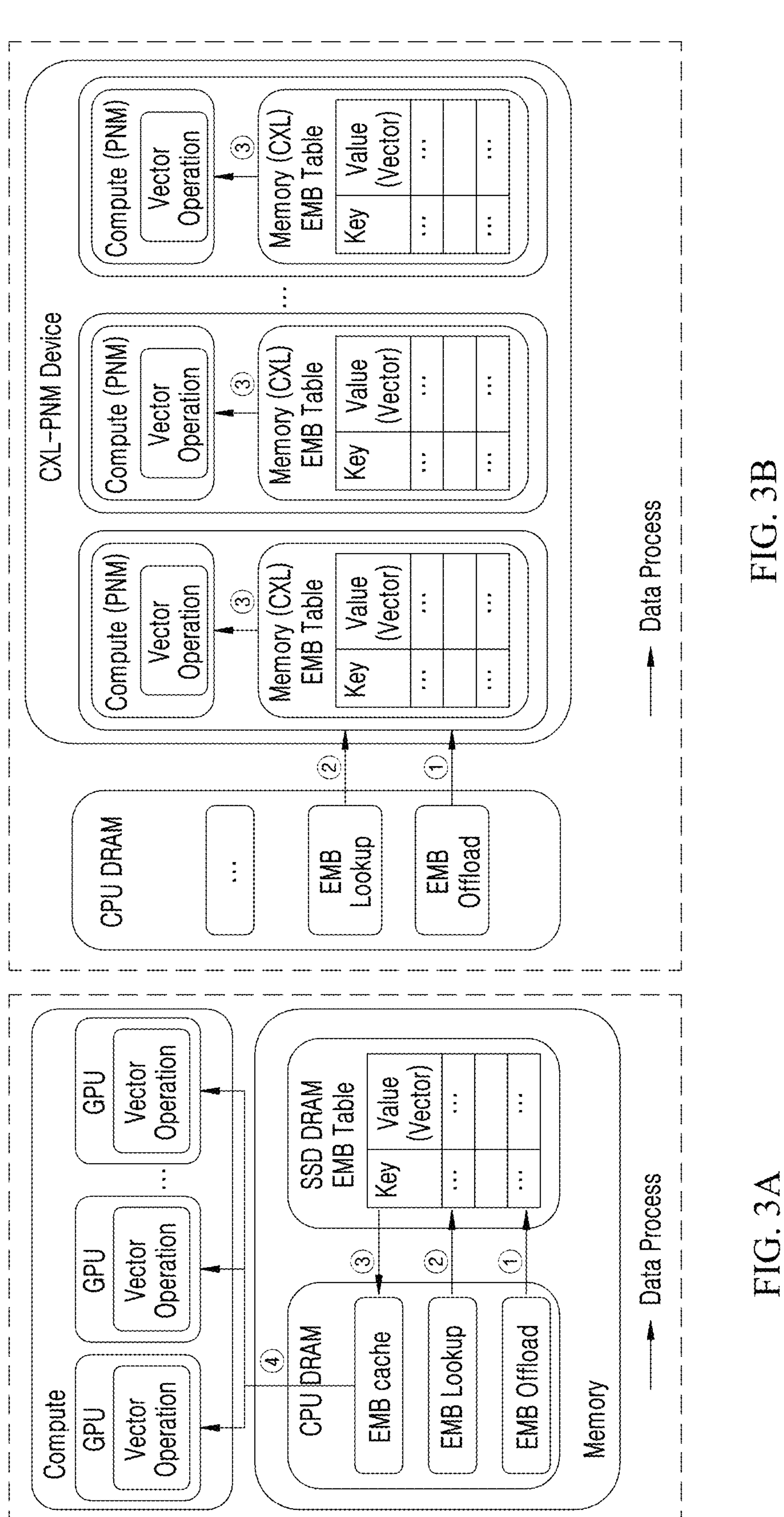
FIG. 3A illustrates a schematic diagram of an SSD-based computing storage architecture in the related art.
FIG. 3B illustrates a schematic diagram of a CXL-PNM-based computing storage architecture according to at least one example embodiment of the inventive concepts.

FIG. 3A illustrates a schematic diagram of an SSD-based computing storage architecture in the related art, and FIG. 3B illustrates a schematic diagram of a CXL-PNM-based computing storage architecture according to at least one example embodiment of the inventive concepts.

Referring to FIG. 3A, an embedding table (EMB Table) may be stored in a solid state disk or solid state drive (SSD) in the related art. During a training process, operations related to the embedding table may mainly include the following items: (1) performing offload of the embedding table (EMB offload) by a CPU, so as to store the acquired embedding table in the SSD; (2) performing a lookup of the embedding table (EMB lookup) by the CPU according to and/or based on the training data, so as to perform lookup in the embedding table stored in the SSD; (3) reading an embedding vector looked up in the embedding table according to and/or based on the training data from the SSD to the DRAM of the CPU through a cache mechanism of the embedding table (EMB cache) in the CPU; and (4) implementing a computing module (Compute) for vector operation by the CPU so as to perform vector operation on the embedding vector read into the DRAM of the CPU.

Accordingly, this method of the related art will perform a large number of frequent data transmissions between the CPU and the memory (SSD) storing embedding table, and between the CPU and the GPU. Also, this multi-GPU implementation is not only costly but also wastes computing resources.

Referring to FIG. 3B, the embedding table may be stored through the CXL-PNM device in at least one example embodiment of the inventive concepts. During the training process, operations related to the embedding table may mainly include the following items: (1) the offload of the embedding table may be performed using the CPU, so as to store the acquired embedding table in a memory of the CXL-PNM device, and the memory of the CXL-PNM device described in one or more example embodiments of the inventive concepts may be a memory expanded through the CXL interface (Memory (CXL)); (2) performing a lookup of the embedding table through the CPU according to and/or based on the training data, so as to perform a lookup in the embedding table stored in the CXL-PNM device; and/or (3) implementing a computing module for vector operation through the PNM in the CXL-PNM device so as to perform vector operation on the embedding vector looked up from the memory of the CXL-PNM device, etc., but the example embodiments are not limited thereto.

Accordingly, this method may reduce or greatly reduce the data transmission (e.g., the amount of data being transmitted, etc.) between the CPU and the memory storing the embedding table (the memory of the CXL-PNM device) without increasing a burden in data transmission between the CPU and the GPU, and/or without requiring the multi-GPU implementation, thereby reducing costs and/or saving computing resources, etc. The integration of the computing module for vector operation with the memory storing the embedding table may also further reduce the data transmission consumption during the training process, etc.

It may be understood that the embedding table is a special key-value mapping. The "Key" is usually a feature ID (and/or index) in the original data, and the "Value" is a low-dimensional vector corresponding to the feature ID, but the example embodiments are not limited thereto. This low-dimensional vector is usually obtained through model training and may capture potential relationships between different features in the original data.

It may be understood that the CPU may be used to execute related computer readable instructions and/or algorithms, such as offload, lookup, etc.; this includes reading location information of the embedding table, distributing system resources (such as a memory, etc.) to temporarily store data, and/or performing operations such as data migration, deletion, etc.; and target data may be quickly located through traversal, indexing, and/or other data structures, which typically involve read and/or compare operations on data in the table, etc., but the example embodiments are not limited thereto.

As the main memory of an embedding system, the DRAM may be used to store operating systems, application programs, and/or runtime data, etc. During a process of offloading the embedding table, the DRAM may be used to temporarily store data read from the table, store temporary data and/or logs generated during the offloading process, and the like. The quick access characteristic of the DRAM may enable these operations to be performed efficiently.

According to at least one example embodiment of the inventive concepts, when there are multiple CXL-PNM devices, during the process of the EMB lookup, the lookup efficiency may be improved by performing parallel lookup in the memory through the computing modules of the multiple CXL-PNM devices, but the example embodiments are not limited thereto.

According to at least one example embodiment of the inventive concepts, the storing of the embedding table into the memory of the at least one CXL-PNM device may include, but is not limited to: storing an embedding vector corresponding to an item set of which access correlation is greater than a desired and/or preset threshold in the embedding table into a memory of the same CXL-PNM device among the at least one CXL-PNM device, wherein the embedding table may be constructed based on a dataset containing at least one transaction, and each data item in the item set (e.g., dataset) may be contained in a transaction of the dataset, but is not limited thereto.

According to at least one example embodiment of the inventive concepts, the embedding table may be constructed for any one or more datasets, such as user behavior data, social media data, transaction data, medical record data, etc., and each dataset may contain at least one corresponding transaction data.

According to at least one example embodiment of the inventive concepts, the item set of which the access correlation is greater than the desired and/or preset threshold in the dataset (e.g., a high access correlation item set, etc.) may be computed through an association rule mining algorithm such as Apriori and equivalence class transformation (Eclat), and the embedding vector corresponding to the high access correlation item set in the embedding table may be centrally stored in the memory of the same CXL-PNM device to implement a centralized access in the training process and/or improve query efficiency of the embedding vector, etc.

Figures 4A, 4B:
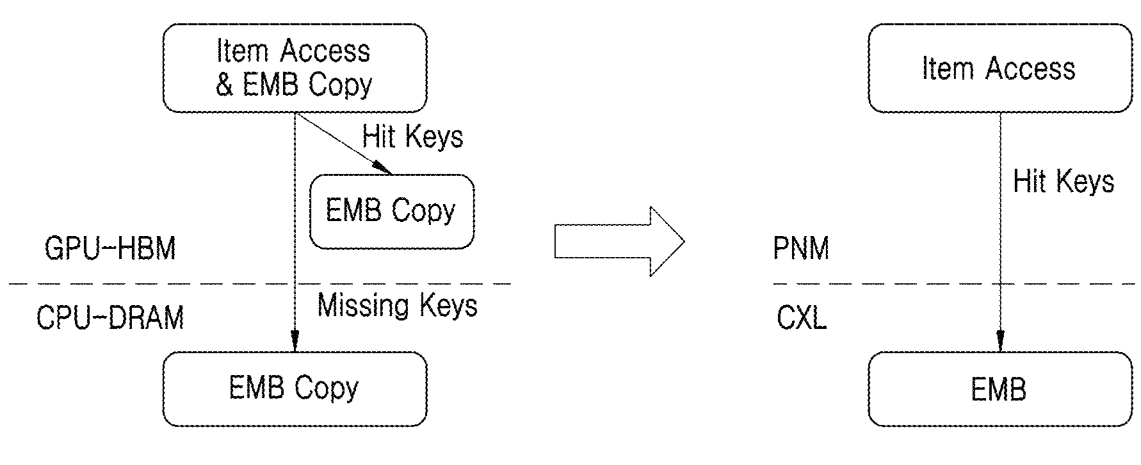
FIG. 4A illustrates a schematic diagram of a comparison of an access hit rate to an embedding vector of a computing storage architecture in the related art.
FIG. 4B illustrates a schematic diagram of a computing storage architecture in at least one example embodiment of the inventive concepts.

FIG. 4A illustrates a schematic diagram of a comparison of an access hit rate to an embedding vector of a computing storage architecture in the related art, and FIG. 4B illustrates a computing storage architecture according to at least one example embodiment of the inventive concepts.

Referring to FIG. 4A, in the related art, partial embedding table is saved in advance in the HBM of the GPU through EMB copy during model training. For the embedding vector that has been saved in the GPU, if it is accessed (and/or read) using EMB lookup during the training, it may be directly hit by key matching (e.g., Hit keys), but for the embedding vector that is not saved in the GPU, there will be a miss (e.g., Missing keys) in the GPU when accessed, and it needs to be read in the CPU. The embedding table stored in the DRAM of the CPU may also be obtained from a memory, such as an SSD through EMB copy. Therefore, during the EMB lookup, in the related art, operations such as embedding access (and/or Items Access) and EMB copy at least need to be performed through an index corresponding to an item, and a hit rate of the first access is low.

Referring to FIG. 4B, according to at least one example embodiment of the inventive concepts, if the embedding table is stored in the memory of the CXL, it may be directly read through the PNM, and a case where the access fails to hit will not occur, and during the EMB lookup, only operations such as items access may be performed without performing the operation of EMB copy.

According to at least one example embodiment of the inventive concepts, the storing the embedding vector corresponding to the item set of which the access correlation is greater than the desired and/or preset threshold in the embedding table into the memory of the same CXL-PNM device among the at least one CXL-PNM device may include, but is not limited to: the item set of which the access correlation is greater than the desired and/or preset threshold may be obtained through parallel computing of the computing module of the at least one CXL-PNM device based on a frequent pattern growth algorithm; and/or the embedding vector corresponding to the obtained item set of which the access correlation is greater than the desired and/or preset threshold may be stored into the memory of the same CXL-PNM device, but is not limited thereto.

According to at least one example embodiment of the inventive concepts, a frequent pattern growth (FP-growth) is an efficient correlation rule mining algorithm that may be applied to concurrent computing of big data, but the example embodiments are not limited thereto.

Figure 5:
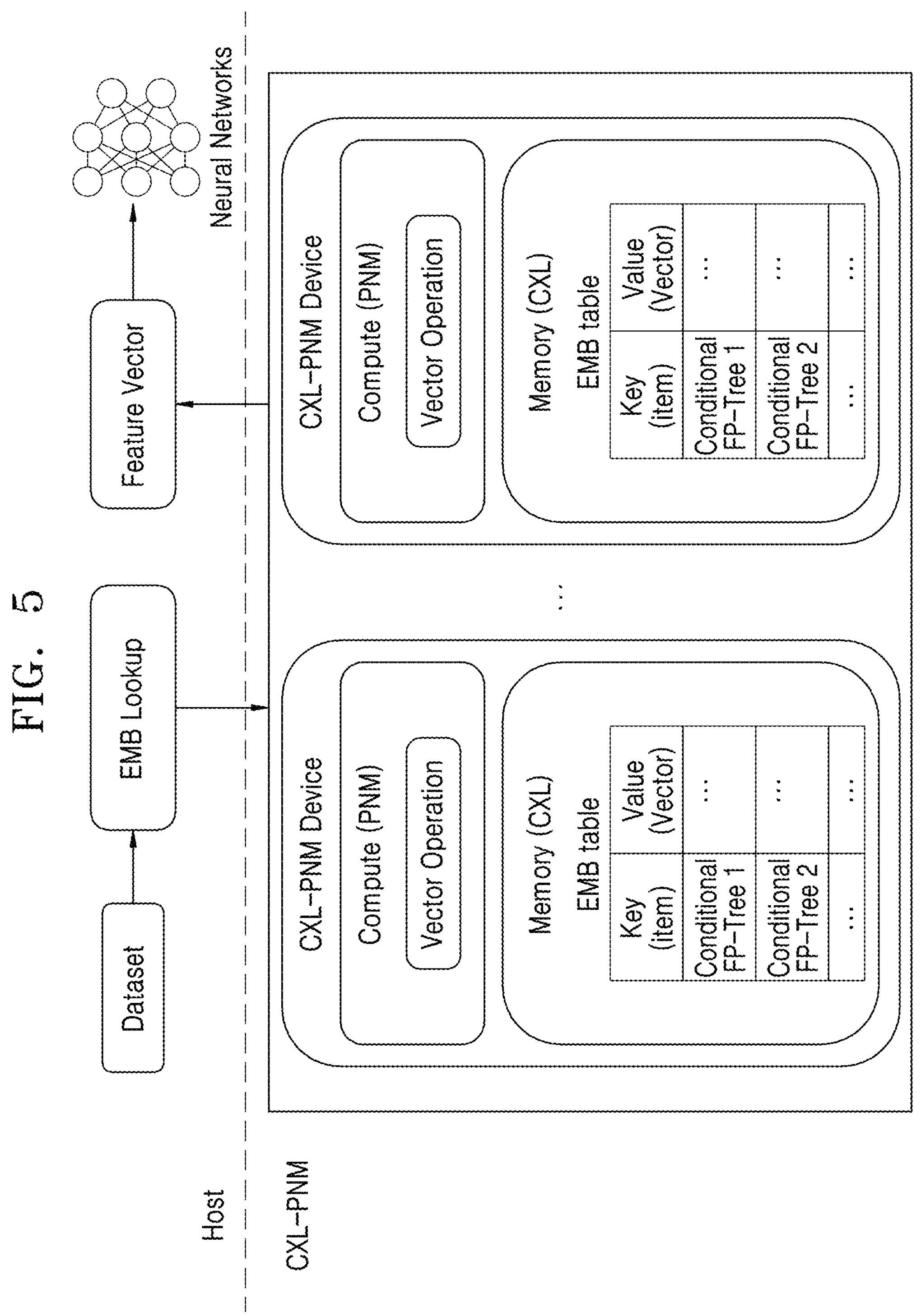
FIG. 5 illustrates a framework diagram of a CXL-PNM-based computing storage architecture in at least one example embodiment of the inventive concepts.

FIG. 5 illustrates a framework diagram of a CXL-PNM-based computing storage architecture in at least one example embodiment of the inventive concepts.

Referring to FIG. 5, according to at least one example embodiment of the inventive concepts, a process of training a model to look up, operate, and/or update an embedding table may include a host side (e.g., at least one host device, etc.) and a CXL-PNM device side, but is not limited thereto. The CXL-PNM device side may include a plurality of CXL-PNM devices to increase storage capacity; the embedding table may be split and stored into the plurality of CXL-PNM devices. The splitting manner may be that the embedding vectors corresponding to each high access correlation item set mined through the frequent pattern growth algorithm are centrally stored in a memory of at least one CXL-PNM device, respectively; therefore, in the memory of the CXL-PNM device, the embedding vector is stored in the form of a conditional frequent pattern tree (Conditional FP-Tree), that is, each item in the conditional frequent pattern tree is a high access correlation item set, and an index set corresponding to the high access correlation item set is stored in a memory of one or more CXL-PNM devices, but the example embodiments are not limited thereto.

It may be understood that the item corresponds to the index (Key) of the embedding vector, but is not limited thereto.

The host side (e.g., host device, etc.) may generate a corresponding embedding table lookup instruction according to and/or based on the dataset, so that the CXL-PNM device side may look up the corresponding embedding vector in the memory of the CXL-PNM device according to and/or based on the EMB lookup instruction, and may also perform vector operation on the embedding vector looked up in the computing module (PNM) of the CXL-PNM device. It may be understood that the vector operation is not a necessary operation for each time of EMB lookup, or in other words, the vector operation is an optional operation. Next, the host side reads the embedding vector looked up from the CXL-PNM device side, that is, a feature vector corresponding to the current dataset, and may use the feature vector for the training process of a neural network, etc.

According to at least one example embodiment of the inventive concepts, the obtaining the item set of which the access correlation is greater than the desired and/or preset threshold may include but is not limited to: evenly distributing a computing task of obtaining the item set of which the access correlation is greater than the desired and/or preset threshold in the dataset to the computing module of each CXL-PNM device, so as to complete the computing task through parallel work of the computing module of the each CXL-PNM device, but is not limited thereto. Evenly distributing a computing task of mining a high access correlation item set among each CXL-PNM device may further improve computing efficiency.

According to at least one example embodiment of the inventive concepts, the obtaining the item set of which the access correlation is greater than the desired and/or preset threshold may include but is not limited to: a feature embedding table respectively corresponding to a feature of each dimension may be constructed for the feature of the each dimension of the dataset; and/or parallel computing may be performed on the each feature embedding table through the computing module of the at least one CXL-PNM device to perform the following operations: a sub-frequent pattern tree respectively corresponding to the each feature embedding table may be constructed, and a corresponding support threshold for the each sub-frequent pattern tree may be set respectively; attributes and links of the each sub-frequent pattern tree may be merged to obtain a global frequent pattern tree; the obtained global frequent pattern tree may be sequentially processed from node items at a bottom layer, and for a current node item, a conditional frequent pattern library corresponding to the current node item may be constructed according to and/or based on a sub-frequent pattern tree corresponding to the current node item in the global frequent pattern tree; a conditional frequent pattern tree corresponding to the current node item may be constructed according to and/or based on the conditional frequent pattern library corresponding to the current node item and the support threshold of the sub-frequent pattern tree corresponding to the current node item; and/or the item set which contains the current node item and of which the access correlation is greater than the desired and/or preset threshold may be obtained according to and/or based on the conditional frequent pattern tree corresponding to the current node item, etc., but the example embodiments are not limited thereto.

According to at least one example embodiment of the inventive concepts, a minimum support (Min_sup) of FP-growth determines the overall performance of the algorithm. If the minimum support is not set properly, a large amount of "long tail" data will be filtered, which will adversely affect the performance of the recommendation system. Therefore, it may be overcome through an FP-growth algorithm-based multi-support concept according to at least one example embodiment of the inventive concepts.

Figure 6:
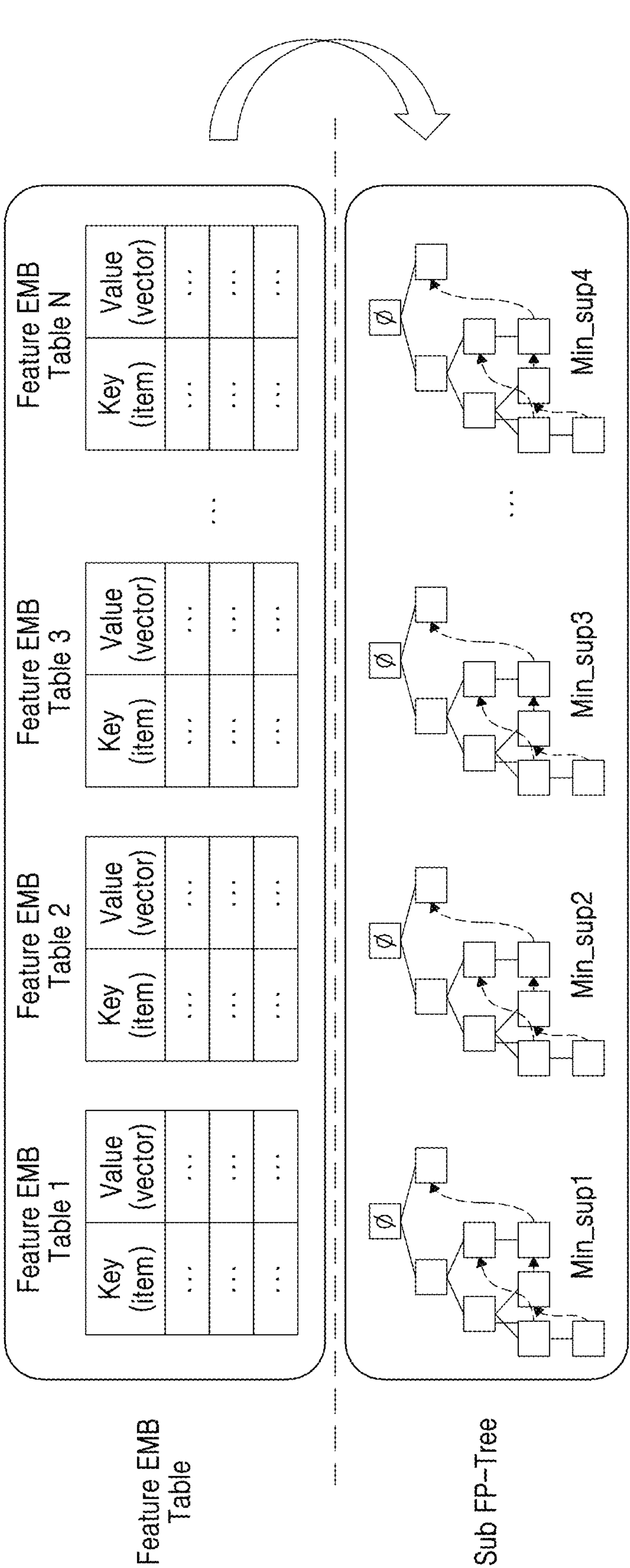
FIG. 6 illustrates a schematic diagram of an FP-growth algorithm-based multi-support concept in at least one example embodiment of the inventive concepts.

FIG. 6 illustrates a schematic diagram of an FP-growth algorithm-based multi-support concept in at least one example embodiment of the inventive concepts.

Referring to FIG. 6, a feature embedding table (Feature EMB Table) may be constructed and/or generated for a feature of each dimension of the dataset; in other words, the embedding table may be split according to and/or based on the feature of each dimension of the corresponding dataset to obtain the feature embedding table corresponding to the feature of the each dimension. Next, a corresponding sub-frequent pattern tree (Sub FP-Tree) may be constructed and/or generated based on each feature embedding table. For each sub-frequent pattern tree, different minimum supports may be maintained according to and/or based on access information of different feature embedding tables, thereby improving and/or optimizing the performance of the algorithm, but the example embodiments are not limited thereto.

According to at least one example embodiment of the inventive concepts, when the minimum support is computed, different support thresholds may be set for all of the feature embedding tables according to and/or based on the number of items contained in the feature embedding table (EMB items) stored in the CXL device, the correlation between items, and the access heat of the feature embedding table. A smaller support threshold may be set for a feature embedding table that is accessed more frequently. If the support threshold is larger, it indicates that the more accurate the obtained item having correlation is, but the less the number is. As an example only, if the support threshold of feature embedding table 1 (EMB table 1) is set to 50%, then a minimum support=0.5× the total number of access IDs, and a value is a decimal point that may be rounded down.

According to at least one example embodiment of the inventive concepts, the FP-growth algorithm-based multi-support concept may be implemented as an MS-PFP-Growth algorithm, but the example embodiments are not limited thereto.

Figure 7:
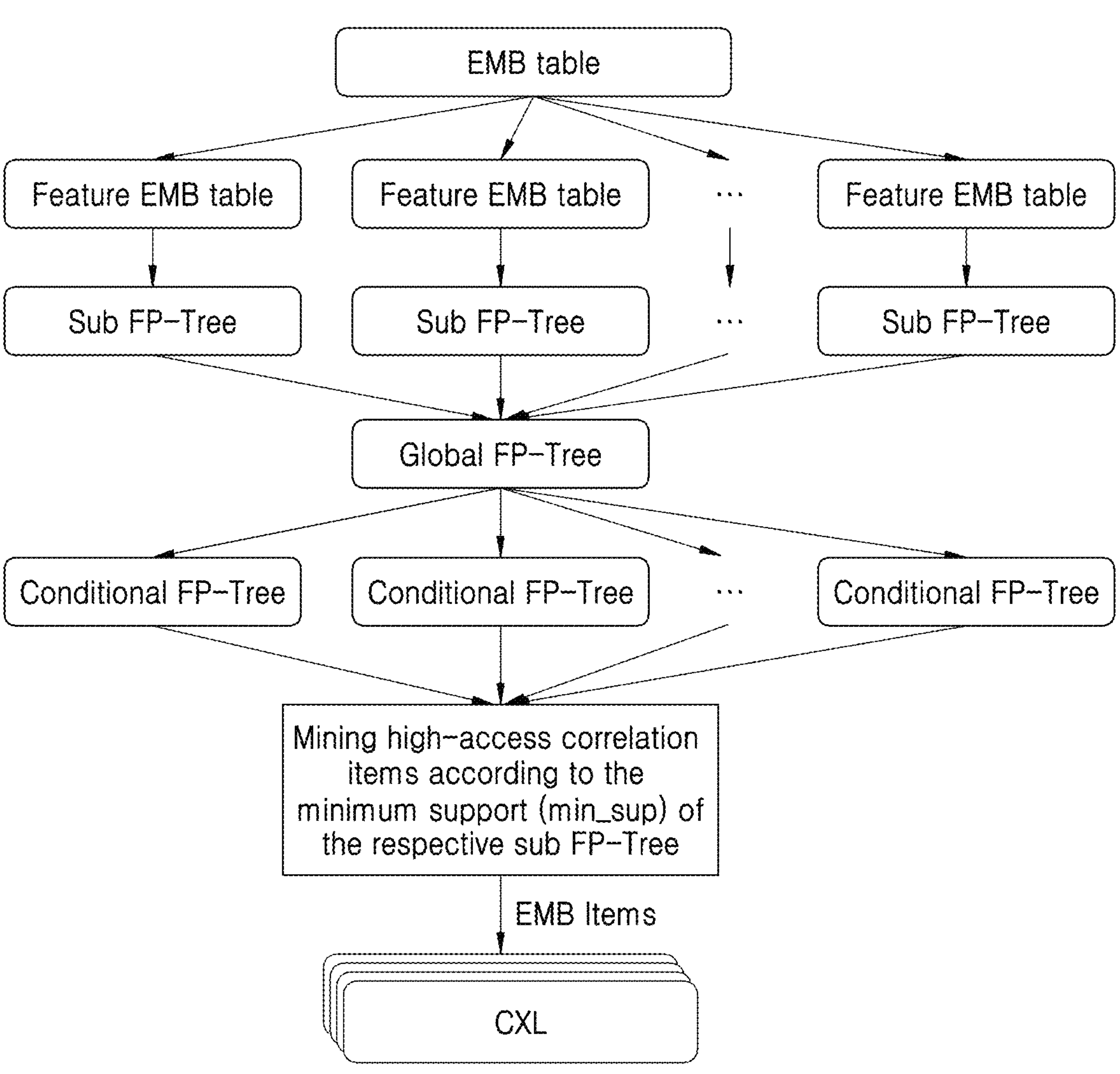
FIG. 7 illustrates a schematic diagram of a flowchart of an MS-PFP-Growth algorithm in at least one example embodiment of the inventive concepts.

FIG. 7 illustrates a schematic diagram of a flowchart of an MS-PFP-Growth algorithm in at least one example embodiment of the inventive concepts.

Referring to FIG. 7, for example, the workflow of the MS-PFP-Growth algorithm may be as follows: (1) a sub-frequent pattern tree may be generated: after the embedding table is split into a plurality of feature embedding tables to be stored in the memory of multiple CXL-PNM devices, all of the feature embedding tables may be computed in parallel by the computing module of each CXL-PNM device to generate the sub-frequent pattern tree corresponding to each feature embedding table, each sub-frequent pattern tree having a corresponding minimum support corresponding to a support threshold; (2) the sub-frequent pattern trees may be merged: after all of the sub-frequent pattern trees are constructed, they may be merged to construct a global frequent pattern tree; (3) a conditional frequent pattern tree may be constructed: the global frequent pattern tree in (2) may be used to construct the conditional frequent pattern tree; and/or (4) a high access correlation item set may be mined: the conditional frequent pattern tree may be recursively mined while growing the set of high access correlation items it contains to mine the high access correlation item set according to and/or based on the conditional frequent pattern tree; if the conditional frequent pattern tree contains only one path, the contained high access correlation item set may be directly generated, and the embedding vectors (e.g., EMB Items) corresponding to each item in the high access correlation item set in the embedding table are centrally stored in a CXL-expanded memory, but the example embodiments are not limited thereto. In the process of mining the high access correlation item set, the support threshold corresponding to each sub-frequent pattern tree may be relied on.

According to at least one example embodiment of the inventive concepts, the sub-frequent pattern tree may be generated by: setting I={a_1, a_2, . . . , a_m} as a set of m items (e.g., items) contained in the feature embedding table; and D={I_1, I_2, . . . , I_n} as data containing n access item sets, I_i={a_i1, a_i2, . . . , a_ik}, and a_ij∈I,k≤m and i=1, . . . , n.

In operation (1), an empty root node of the sub-frequent pattern tree may be defined, and the minimum support (e.g., a desired threshold, etc.) of the sub-frequent pattern tree may be defined; in operation (2), all items may be counted, but the example embodiments are not limited thereto. A count C (e.g., a frequency of occurrence, etc.) of items is the number of item sets of a contained in D: In operation (3), infrequently accessed items of which the support is less than the minimum support (e.g., desired threshold) may be discarded to obtain an item set frequently accessed (which may be arranged in a descending order), but the example embodiments are not limited thereto.

FIG. 8 illustrates a schematic diagram of frequently accessed item sets generated in at least one example embodiment of the inventive concepts.

Referring to an access list illustrated in FIG. 8, for example, for six pieces of transaction data containing the access item sets, that is, an AID column, the indexes are 001 to 006, but is not limited thereto. The set of items contained respectively in each transaction data is as shown in the column of Items, and each item shown in the column of Items corresponds to an index (key) of the embedding vector. In the set of items contained in each transaction data shown in the third column, if the frequently accessed item sets are obtained after the infrequently accessed items of which the support is less than the minimum support is discarded, the frequently accessed item set may be arranged in a descending order, but the example embodiments are not limited thereto. In other words, the transaction data may be compressed by determining whether access items are frequently or infrequently accessed items in the dataset and discarding the infrequently accessed items.

In operation (4), each item in the sorted frequently accessed item sets may be read starting from an empty set, so as to construct the sub-frequent pattern tree; if there is already a current item in the current sub-frequent pattern tree, then a value of the item may be increased; if there is no current item in the tree, then a branch may be added, but the example embodiments are not limited thereto.

In order to facilitate subsequent access correlation mining, a header table structure may be added to the sub-frequent pattern tree, but the example embodiments are not limited thereto.

Figure 9:
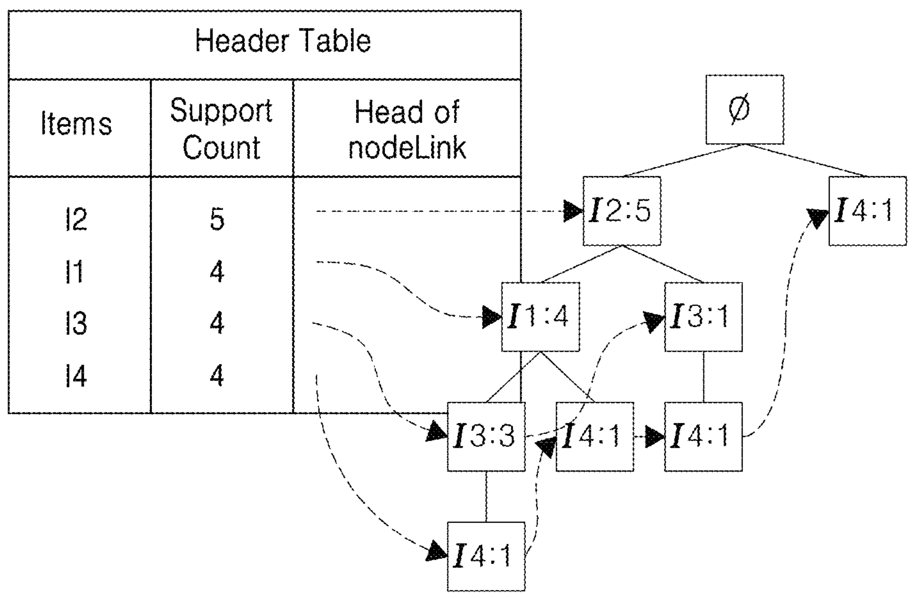
FIG. 9 illustrates a schematic diagram of a structure of a header table in at least one example embodiment of the inventive concepts.

FIG. 9 illustrates a schematic diagram of a structure of a header table in at least one example embodiment of the inventive concepts.

Referring to FIG. 9, each entry in the header table, that is, the header table of frequent items, may include three fields, e.g., (1) item name (Items): the same as the nodes of the sub-frequent pattern tree, the nodes of the sub-frequent pattern tree are node items; (2) support count: the number of transactions represented by partial path to the node; and/or (3) head of node link (Head of nodeLink): a pointer pointing to the first node of the item name contained in the sub-frequent pattern tree, etc., but the example embodiments are not limited thereto.

According to at least one example embodiment of the inventive concepts, the global frequent pattern tree may be obtained by merging the sub-frequent pattern trees to be a global frequent pattern tree. For example, attributes and links in the header table corresponding to each sub-frequent pattern tree may be merged; "attributes" here may include an item name and/or a support count in the header table, etc., but is not limited thereto. The item names in each sub-frequent pattern tree may be merged, and the count of the item names and head of node link may be updated to merge the sub-frequent pattern trees into the global frequent pattern tree. Therefore, a global node link list composed of the global frequent pattern tree, a global header table corresponding to the global frequent pattern tree, and/or a global node link head corresponding to the global frequent pattern tree may be obtained, but the example embodiments are not limited thereto.

According to at least one example embodiment of the inventive concepts, the conditional frequent pattern tree may be generated by: mining which may be started, e.g., sequentially from bottom layer items of the global header table; for each item in the global header table corresponding to the global frequent pattern tree, a conditional frequent pattern library corresponding thereto may be found. The conditional frequent pattern library is a sub-frequent pattern tree corresponding to a leaf node (e.g., the current node item) to be mined. After obtaining the sub-frequent pattern tree, the count of each node in the sub-frequent pattern tree may be set to be the count of leaf nodes (e.g., finding a prefix path of the current node, and each prefix path of the current node including a conditional pattern base of the current node), and nodes of which the count is lower than the minimum support may be deleted, but the example embodiments are not limited thereto. From the conditional frequent pattern library, the set of items having high access correlation, that is, the high access correlation item set, may be recursively mined, but is not limited thereto.

Figure 10:
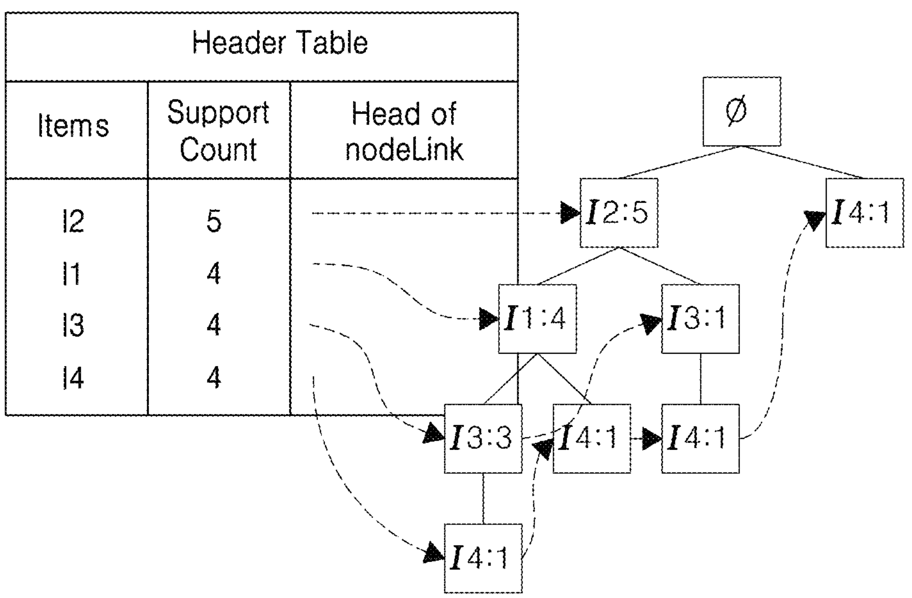
FIG. 10 illustrates a schematic diagram of a global frequent pattern tree in at least one example embodiment of the inventive concepts.

FIG. 10 illustrates a schematic diagram of a global frequent pattern tree in at least one example embodiment of the inventive concepts.

Figure 11:
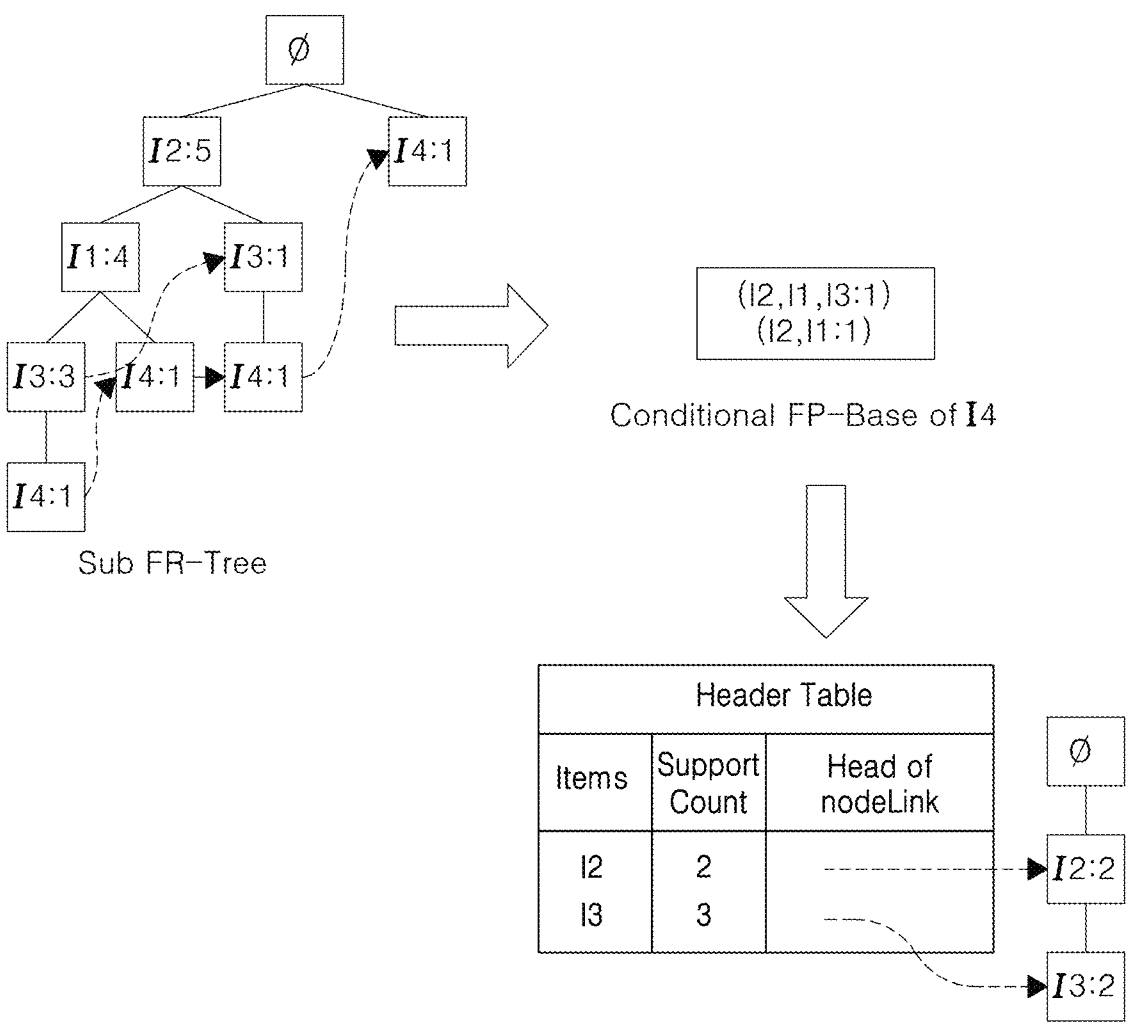
FIG. 11 illustrates a schematic diagram of a flowchart of generating a conditional frequent pattern library corresponding to a node 14 in at least one example embodiment of the inventive concepts.

FIG. 11 illustrates a schematic diagram of a flowchart of generating a conditional frequent pattern library corresponding to a node 14 in at least one example embodiment of the inventive concepts.

According to at least one example embodiment of the inventive concepts, the high access correlation item set may be mined by: for example, if the lowest node item of the global frequent pattern tree is I5, I5 is not considered because the count of minimum support being 3 is not reached, therefore it may be deleted to obtain the global frequent pattern tree as shown in FIG. 10, but the example embodiments are not limited thereto. If the next lower node is I4, assuming that the sub-frequent pattern tree corresponding to the node I4 is as shown in FIG. I1, I4 appears in four branches, {I2, I1,I3,I4:1}, {I2,I1,I4:1}, {I2,I3,I4:1} and {I4:1}. When I4 is taken as a suffix, the prefix paths will be {I2,I1,I3:1}, {I2,I1:1} and {I2,I3:1}, and these prefix paths then form the conditional pattern base of the node I4; however, there are nodes in two branches that do not meet the condition of the minimum support being 3, therefore it may be considered that I4 only appears in two branches, e.g., {I2,I1,I3,I4:1} and {I2,I1,I4:1}. Therefore, I4 is taken as the suffix and the prefix paths will be {I2,I1,I3:1} and {I2,I1:1}, and these will then form the conditional pattern base of the node 14, but the example embodiments are not limited thereto.

The conditional frequent pattern library is regarded as a transaction database, and a conditional frequent pattern tree may be constructed and/or generated accordingly. Therefore, the conditional frequent pattern library of the node I4 will contain {I2:2,I1:2}, and I3 is not considered because the count of minimum support is not met. Therefore, the set of all high access correlation items corresponding to the node I4, that is, the high access correlation item set, is: {I2,I4:2}, {I1,I4:2} and {I2,I1,I4:2}, but the example embodiments are not limited thereto.

For I3, prefix paths are {I2,I1:4} and {I2:1}, which will generate a conditional frequent pattern tree of 2 nodes: {I2:5,I1:4}, and may generate corresponding high access correlation item sets: {I2,I3:4}, {i1,I3:3} and {i2,i1,i3:3}, but the example embodiments are not limited thereto.

For I1, a prefix path is {I2:4}, which will generate a conditional frequent pattern tree of a single node: {I2:4}, and may generate a corresponding high access correlation item set: {I2,I1:4}, but the example embodiments are not limited thereto.

That is, the above process may obtain the results shown in the following table, but is not limited thereto:

| Node Item | Conditional Pattern Base | Conditional Frequent Pattern Tree | High Access Correlation Item Set |
|---|---|---|---|
| I4 | {I2, I1, I3:1}, {I2, I1:1} | {I2:2, I1:2} | {I2, I4:2}, {I1, I4:2}, {I2, I1, I4:2} |
| I3 | {I2, I1:4} and {I2:1} | {I2:5, I1:4} | {i2, i3:4}, {i1, i3:3} and {i2, i1, i3:3} |
| I1 | {I2:4} | {I2:4} | {I2, I1:4} |

According to at least one example embodiment of the inventive concepts, in order to reduce or even eliminate an access error rate, an embedding vector corresponding to an item having high access correlation may be stored in the same CXL device, and multiple CXLs may work in parallel, but the example embodiments are not limited thereto. The storage of the embedding vector corresponding to the item having high access correlation may conform to uniformity and/or access correlation: (1) uniformity: a computing task related to an embedding table may be evenly distributed among multiple PNM devices to enable and/or ensure that all PNMs are in a working state; and/or (2) access correlation: the item having high access correlation may be mined through a multi-support-Parallel FP-Growth algorithm (MS-PFP-Growth), but the example embodiments are not limited thereto. These sets of items having high access correlation may be stored in the form of the conditional frequent pattern tree in proximity of the CXL to facilitate access and/or computing by a recommendation algorithm and the like.

Figure 12:
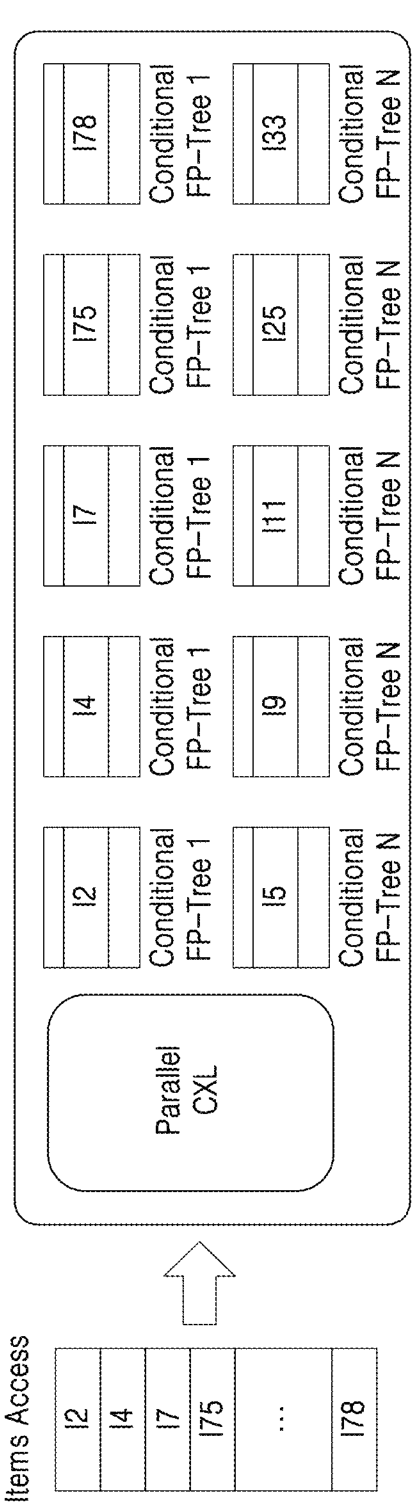
FIG. 12 illustrates a schematic diagram of storing high access correlation item sets in the form of a conditional frequent pattern tree in at least one example embodiment of the inventive concepts.

FIG. 12 illustrates a schematic diagram of storing high access correlation item sets in the form of a conditional frequent pattern tree in at least one example embodiment of the inventive concepts.

Referring to FIG. 12, according to at least one example embodiment of the inventive concepts, since each conditional frequent pattern tree may be mined for the access items in the illustration, embedding vectors corresponding to items contained in the conditional frequent pattern tree corresponding to each item may be centrally stored in proximity of the CXL, and multiple CXLs may be used in parallel to expand the storage capacity, but the example embodiments are not limited thereto.

According to at least one example embodiment of the inventive concepts, when the storing method of the embedding table of at least one example embodiment of the inventive concepts is applied to a recommendation system, the performance of the recommendation system may be improved; the MS-PFP-Growth algorithm may be used to mine items having high access correlation, and/or the embedding vectors corresponding to these items may be offloaded into the memory of the CXL-PNM device, which may reduce the access error rate of the embedding table and/or improve the performance of the recommendation system, etc.

According to at least one example embodiment of the inventive concepts, a total cost of ownership (TCO) may be reduced: a cost of the CXL-PNM device is lower than that of a GPU, and there is no communication bottleneck in a solution using the CXL-PNM device compared to a solution using a multi-GPU, but the example embodiments are not limited thereto.

According to at least one example embodiment of the inventive concepts, efficient running of the recommendation system after memory expansion may be improved and/or ensured: an embedding table offloading solution using the CXL-PNM device may reduce data interaction between the CPU and memory data, and the problem of storage limitation of the embedding table in the recommendation system may be improved and/or solved by expanding multiple CXL-PNM devices, etc.

Figure 13:
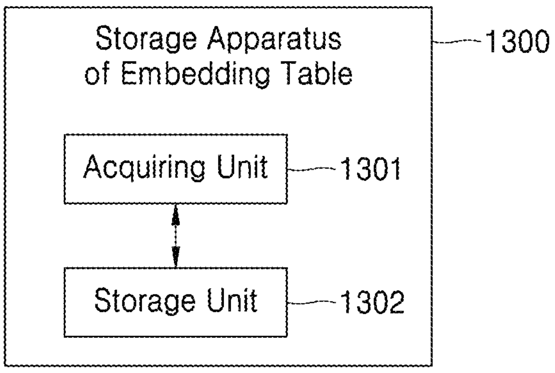
FIG. 13 illustrates a block diagram of a storage apparatus of an embedding table in at least one example embodiment of the inventive concepts.

FIG. 13 illustrates a block diagram of a storage apparatus of an embedding table in at least one example embodiment of the inventive concepts.

Referring to FIG. 13, at least one example embodiment of the inventive concepts further provides a storage apparatus 1300 configured to store an embedding table which may include, but is not limited to, an acquiring unit 1301 and/or a storage unit 1302, etc.

The acquiring unit 1301 (e.g., acquiring circuitry, processing circuitry, acquiring device, etc.) may acquire at least one embedding table.

The storage unit 1302 (e.g., storage device, etc.) may store the embedding table into a memory of at least one CXL-PNM device to facilitate parallel lookup in the memory through a computing module of the at least one CXL-PNM device during the lookup of the embedding table, wherein the at least one CXL-PNM device contains the memory and/or the computing module, etc., but the example embodiments are not limited thereto.

According to at least one example embodiment of the inventive concepts, the storage unit 1302 may store at least one embedding vector corresponding to at least one item set of which access correlation is greater than a desired and/or preset threshold in the embedding table into a memory of the same CXL-PNM device among the at least one CXL-PNM device, wherein the embedding table may be constructed based on a dataset containing at least one transaction, and each data item in the item set may be contained in a transaction of the dataset.

According to at least one example embodiment of the inventive concepts, the storage unit 1302 may obtain the item set of which the access correlation is greater than the desired and/or preset threshold through parallel computing of the computing module of the at least one CXL-PNM device based on, for example, a frequent pattern growth algorithm, and may store the embedding vector corresponding to the obtained item set of which the access correlation is greater than the desired and/or preset threshold into the memory of the same CXL-PNM device, but the example embodiments are not limited thereto.

According to at least one example embodiment of the inventive concepts, the storage unit 1302 may evenly distribute a computing task of obtaining the item set of which the access correlation is greater than the desired and/or preset threshold in the dataset to the computing module of each CXL-PNM device, so as to complete the computing task through parallel work of the computing module of the each CXL-PNM device.

According to at least one example embodiment of the inventive concepts, the storage unit 1302 may construct a feature embedding table respectively corresponding to at least one feature of each dimension for the at least one feature of the each dimension of the dataset, and perform parallel computing on the each feature embedding table through the computing module of the at least one CXL-PNM device to perform operations including, but not limited to, the following: constructing a sub-frequent pattern tree respectively corresponding to the each feature embedding table, and setting a corresponding support threshold for the each sub-frequent pattern tree respectively; merging attributes and links of the each sub-frequent pattern tree to obtain a global frequent pattern tree; sequentially processing the obtained global frequent pattern tree from node items at a bottom layer, and for a current node item, constructing a conditional frequent pattern library corresponding to the current node item according to a sub-frequent pattern tree corresponding to the current node item in the global frequent pattern tree; constructing a conditional frequent pattern tree corresponding to the current node item according to the conditional frequent pattern library corresponding to the current node item and the support threshold of the sub-frequent pattern tree corresponding to the current node item; and/or obtaining the item set which contains the current node item and of which the access correlation is greater than the desired and/or preset threshold according to the conditional frequent pattern tree corresponding to the current node item, etc., but the example embodiments are not limited thereto.

It may be understood that in the above example embodiment of the storage apparatus 1300 of the embedding table, the specific implementation process is substantially the same as that in the above example embodiment of the storing method of the embedding table, and will not be described here in detail, but the example embodiments are not limited thereto. The storage apparatus 1300 of the embedding table may be respectively configured as special purpose hardware, or a combination of hardware executing special purpose software and/or special purpose firmware, to perform the particular functions of the one or more methods described herein. For example, these apparatuses may correspond to dedicated integrated circuits and/or may also correspond to modules combining software and hardware. In addition, one or more functions implemented by these apparatuses may also be uniformly executed by components in a physical entity device (for example, a processor, a client device, or a server, etc.).

Figure 14:
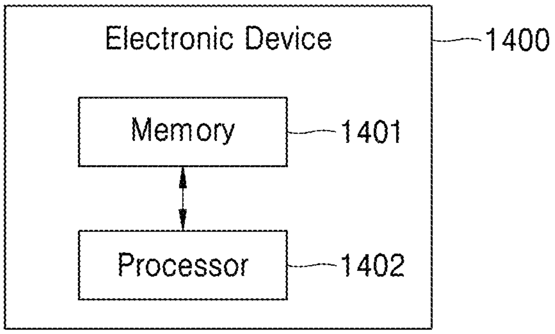
FIG. 14 illustrates a block diagram of an electronic device in at least one example embodiment of the inventive concepts.

FIG. 14 illustrates a block diagram of an electronic device in at least one example embodiment of the inventive concepts.

Referring to FIG. 14, an electronic device 1400 includes at least one memory 1401 and at least one processor 1402 (e.g., processing circuitry, etc.), wherein the at least one memory 1401 stores a set of special purpose computer executable instructions (e.g., computer readable instructions, etc.). When executed by the at least one processor 1402, the set of special purpose computer executable instructions executes the storing method of the embedding table according to some example embodiments of the inventive concepts.

As an example, the electronic device 1400 may be a PC computer, a tablet device, a personal digital assistant, a smart phone, and/or other devices capable of executing the above set of computer readable instructions. Here, the electronic device 1400 does not have to be a single electronic device, but may also be any device or a collection of circuits that may execute the above computer readable instructions (and/or set of instructions) separately or jointly. The electronic device 1400 may also be a part of an integrated control system and/or a system manager, etc., and/or may be configured as a portable electronic device interconnecting with a local and/or remote (e.g., via a wired and/or wireless transmission) interface, etc.

In the electronic device 1400, the processor 1402 (e.g., processing circuitry, etc.) may include a central processing unit (CPU), a graphics processing unit (GPU), a programmable logic device, a dedicated processor system, a microcontroller, and/or a microprocessor, etc. As an example rather than a limitation, the processor may also include an analog processor, a digital processor, a microprocessor, a multi-core processor, a processor array, a network processor, etc.

The processor 1402 may execute computer readable instructions and/or code stored in the memory 1401, wherein the memory 1401 may also store data. Computer readable instructions and/or data may also be transmitted and/or received via at least one network through at least one network interface device, wherein the network interface device may adopt at least one known transmission protocol.

The memory 1401 may be integrated with the processor 1402, for example, an RAM and/or flash memory, etc., is arranged in an integrated circuit microprocessor, etc. In addition, the memory 1401 may include an independent device, such as an external disk drive, a storage array, and/or any other storage device that may be used by a database system. The memory 1401 and the processor 1402 may be operatively coupled, and/or may communicate with each other, for example, through an I/O port, a network connection, etc., so that the processor 1402 can read files stored in the memory.

In addition, the electronic device 1400 may also include a video display (such as a liquid crystal display, etc.) and/or a user interaction interface (such as a keyboard, a mouse, a touch input device, etc.). All components of the electronic device 1400 may be connected to each other via a bus and/or a network.

According to at least one example embodiment of the inventive concepts, there may further provide a non-transitory computer readable storage medium storing computer readable instructions, wherein the computer readable instructions, when executed by at least one computing device, cause the at least one computing device to execute the above storing method of the embedding table.

Examples of the non-transitory computer readable storage medium here include: Read Only Memory (ROM), Random Access Programmable Read Only Memory (PROM), Electrically Erasable Programmable Read Only Memory (EEPROM), Random Access Memory (RAM), Dynamic Random Access Memory (DRAM), Static Random Access Memory (SRAM), Flash, Non-Volatile Memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state drive (SSD), card storage (such as, Multimedia Cards, Secure Digital (SD) Cards or Extreme Digital (XD) Cards), magnetic tapes, floppy disks, magneto-optical data storage devices, optical data storage devices, hard disks, solid state disks, and any other device. The any other device is configured to store a computer program and any relevant data, data files and data structures in a non-transitory manner and to provide the computer program and any relevant data, data files and data structures to the processor or computer, so that the processor or computer may execute the computer program. The computer program in the above non-transitory computer readable storage medium may run in an environment deployed in computer devices such as a client, a host, an agent device and a server. In addition, in one example, the computer program and any relevant data, data files and data structures are distributed over networked computer systems, so that the computer program and any relevant data, data files and data structures are stored, accessed and executed in a distributed manner by one or more processors or computers. It should be noted that the computer readable instructions may also be used to execute additional operations in addition to the above operations, or execute more specific processing when executing the above operations. These additional operations and further processed content have been mentioned in the description of the related method, and thus will not be repeated here in order to avoid repetition.

According to at least one example embodiment of the inventive concepts, a system including at least one computing device and at least one storage device storing computer readable instructions, wherein the computer readable instructions, when executed by the at least one computing device, cause the at least one computing device to execute the above storing method of the embedding table.

It should be noted that the system of at least one example embodiment of the inventive concepts may completely rely on the running of the computer programs and/or computer readable instructions to implement corresponding functions, that is, respective units correspond to respective operations in the functional architecture of the computer program, so that the entire system is called through a special software package (for example, lib library) to implement the corresponding functions.

On the other hand, when the above system is implemented by software, firmware, middleware or microcode, a program code or code segment used to perform a corresponding operation may be stored in a computer readable medium such as a non-transitory storage medium, so that at least one processor or at least one computing device may read and execute the corresponding program code or code segment to perform the corresponding operation.

According to at least one example embodiment of the inventive concepts, the storage device may be integrated with the computing device, for example, RAM and/or flash memory are arranged within an integrated circuit microprocessor, etc. In addition, the storage device may include an independent device, such as an external disk drive, a storage array, or any other storage device that may be used by a database system. The storage device and the computing device may be operationally coupled and/or may communicate with each other, for example, through an I/O port, a network connection, etc., so that the computing device can read computer readable instructions stored in the storage device.

According to at least one example embodiment of the inventive concepts, a computer program product including computer programs/instructions, wherein the computer programs/instructions, when executed by a processor, implement the any one storing method of the embedding table as described above.

According to the storing method and/or apparatus of the embedding table, the electronic device, the non-transitory storage medium, the system and the computer program product provided in at least one example embodiment of the inventive concepts, a CXL-PNM device may be used to store and compute the embedding table, so as to improve and/or solve the problems such as memory limitation and storage constraint caused by over-sized embedding table through storage expansion based on the CXL-PNM device, and when it is used in a recommendation system, the performance of the recommendation system may be improved; also, through processing near memory of the CXL-PNM device, data transmission between computing modules such as a CPU and a memory may be reduced or greatly reduced, storage resources of the CPU may be released and/or more efficiently used, and/or a running burden of the CPU may be reduced, so as to improve the execution efficiency of the recommendation system and/or improve and/or optimize the performance of the recommendation system.

In addition, centrally storing embedding vectors corresponding to item sets having high access correlation in the CXL-PNM device may improve the query efficiency of the embedding vectors.

In addition, evenly distributing a computing task among multiple CXL-PNM devices may improve and/or optimize the execution efficiency of the task.

In addition, through a multi-support-Parallel Frequent Pattern algorithm, storage and/or computing architectures of a multi-CXL-PNM device may be relied on to improve and/or more efficiently mine the item sets having high access correlation in data items, so as to improve and/or more efficiently store the embedding vectors corresponding to the item sets having high access correlation in multiple CXL-PNM devices.

Some example embodiments of the inventive concepts are described above. It should be understood that the above descriptions are only examples, and are not limited. More specifically, the example embodiments of the inventive concepts are not limited to the disclosed example embodiments, and many modifications and/or variations may be implemented to one or more of the example embodiments without deviating from the scope and/or spirit of the inventive concepts as defined by the claims herein.

What is claimed is:

1. A storing method of an embedding table, the storing method comprising:

acquiring an embedding table;

storing the embedding table in a memory of at least one Compute Express Link-based Processing-Near-Memory (CXL-PNM) device, wherein each CXL-PNM device of the at least one CXL-PNM device comprises processing circuitry coupled with the memory; and performing parallel lookup of respective portions of the embedding table in the memory, in parallel, using the processing circuitry of the at least one CXL-PNM device.

2. The storing method of the embedding table of claim 1, further comprising:

generating the embedding table based on a dataset containing at least one transaction, wherein each data item in the dataset is contained in a transaction of the dataset; and storing an embedding vector corresponding to an item set in the embedding table into the memory of the at least one CXL-PNM device, each item of the dataset has an access correlation greater than a desired threshold.

3. The storing method of the embedding table of claim 2, further comprising:

obtaining the item set of which the access correlation is greater than the desired threshold based on a frequent pattern growth algorithm; and storing the embedding vector corresponding to the obtained item set into the memory of the at least one CXL-PNM device.

4. The storing method of the embedding table of claim 3, wherein the at least one CXL-PNM device is a plurality of CXL-PNM devices; and the method further comprises, evenly distributing a computing task of obtaining the item set of which the access correlation is greater than the desired threshold in the dataset to the processing circuitry of each of the plurality of CXL-PNM devices; and completing the computing task through parallel work of the processing circuitry of each of the plurality of CXL-PNM devices.

5. The storing method of the embedding table of claim 3, further comprising:

generating a feature embedding table for each dimension of the dataset, each of the feature embedding tables corresponding to a feature of a respective dimension; and performing parallel computing on each of the feature embedding tables using the processing circuitry of the at least one CXL-PNM device, the parallel computing including, generating a sub-frequent pattern tree corresponding to each of the feature embedding tables, setting a corresponding support threshold for each of the sub-frequent pattern trees, merging attributes and links of each of the sub-frequent pattern trees to obtain a global frequent pattern tree, sequentially processing the obtained global frequent pattern tree from a plurality of node items included in the global frequent pattern tree starting from a bottom layer of the obtained global frequent pattern tree, the sequentially processing including, for a current node item of the plurality of node items, generate a conditional frequent pattern library corresponding to the current node item based on the sub-frequent pattern tree corresponding to the current node item in the global frequent pattern tree, generating a conditional frequent pattern tree corresponding to the current node item based on the conditional frequent pattern library corresponding to the current node item and the support threshold of the sub-frequent pattern tree corresponding to the current node item, and obtaining the item set which contains the current node item and of which the access correlation is greater than the desired threshold based on the conditional frequent pattern tree corresponding to the current node item.

6. A storage apparatus of an embedding table, the storage apparatus comprising:

first processing circuitry configured to, acquire an embedding table;

store the embedding table in a memory of at least one Compute Express Link-based Processing-Near-Memory (CXL-PNM) device, wherein each CXL-PNM device of the at least one CXL-PNM device comprises processing circuitry coupled with the memory; and perform parallel lookup of respective portions of the embedding table in the memory, in parallel, using second processing circuitry of the at least one CXL-PNM device.

7. The storage apparatus of the embedding table of claim 6, wherein the first processing circuitry is further configured to:

generate the embedding table based on a dataset containing at least one transaction, wherein each data item in the dataset is contained in a transaction of the dataset; and store an embedding vector corresponding to an item set in the embedding table into the memory of the at least one CXL-PNM device, each item of the dataset has an access correlation greater than a desired threshold.

8. The storage apparatus of the embedding table of claim 7, wherein the first processing circuitry is further configured to:

obtain the item set of which the access correlation is greater than the desired threshold based on a frequent pattern growth algorithm; and store the embedding vector corresponding to the obtained item set into the memory of the at least one CXL-PNM device.

9. The storage apparatus of the embedding table of claim 8, wherein the at least one CXL-PNM device is a plurality of CXL-PNM devices, each of the plurality of CXL-PNM devices including second processing circuitry; and the first processing circuitry is further configured to, evenly distribute a computing task of obtaining the item set of which the access correlation is greater than the desired threshold in the dataset to the second processing circuitry of each of the plurality of CXL-PNM devices; and complete the computing task through parallel work of the second processing circuitry of each of the plurality of CXL-PNM devices.

10. The storage apparatus of the embedding table of claim 8, wherein the first processing circuitry is further configured to:

generate a feature embedding table for each dimension of the dataset, each of the feature embedding tables corresponding to a feature of a respective dimension; and perform parallel computing on each of the feature embedding tables using the second processing circuitry of the at least one CXL-PNM device, the parallel computing including, generating a sub-frequent pattern tree corresponding to each of the feature embedding tables, setting a corresponding support threshold for each of the sub-frequent pattern trees;

merging attributes and links of each of the sub-frequent pattern trees to obtain a global frequent pattern tree;

sequentially process the obtained global frequent pattern tree from a plurality of node items included in the global frequent pattern tree starting from a bottom layer of the obtained global frequent pattern tree, wherein the sequentially processing includes, for a current node item of the plurality of node items, generate a conditional frequent pattern library corresponding to the current node item based on a sub-frequent pattern tree corresponding to the current node item in the global frequent pattern tree, generate a conditional frequent pattern tree corresponding to the current node item based on the conditional frequent pattern library corresponding to the current node item and the support threshold of the sub-frequent pattern tree corresponding to the current node item, and obtain the item set which contains the current node item and of which the access correlation is greater than the desired threshold based on the conditional frequent pattern tree corresponding to the current node item.

11. An electronic device, comprising:

at least one processor; and at least one memory configured to store computer executable instructions, the at least one processor is configured to execute the computer executable instructions to perform the storing method of the embedding table of claim 1.

12. A non-transitory computer readable storage medium storing computer readable instructions, wherein the computer readable instructions, when executed by at least one processor, cause the at least one processor to execute the storing method of the embedding table of claim 1.

13. A system comprising at least one computing device and at least one storage device, wherein the at least one computing device is configured to execute computer readable instructions which cause the at least one computing device to execute the storing method of the embedding table of claim 1.

14. A non-transitory computer readable storage medium storing computer readable instructions, wherein the computer readable instructions, when executed by at least one processor, implements the storing method of the embedding table of claim 5.

* * * * *